(12) United States Patent
Haraguchi et al.

(10) Patent No.: US 7,839,755 B2
(45) Date of Patent: Nov. 23, 2010

(54) INFORMATION RECORDING APPARATUS AND INFORMATION REPRODUCING APPARATUS, INFORMATION RECORDING METHOD AND INFORMATION REPRODUCING METHOD, INFORMATION RECORDING PROGRAM AND INFORMATION REPRODUCING PROGRAM, INFORMATION RECORDING MEDIUM AND RECORDING MEDIUM

(75) Inventors: Yukiyoshi Haraguchi, Tokorozawa (JP); Takao Sawabe, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 871 days.

(21) Appl. No.: 10/588,954

(22) PCT Filed: Jan. 31, 2005

(86) PCT No.: PCT/JP2005/001368

§ 371 (c)(1),
(2), (4) Date: Aug. 10, 2006

(87) PCT Pub. No.: WO2005/078723

PCT Pub. Date: Aug. 25, 2005

(65) Prior Publication Data

US 2008/0285430 A1    Nov. 20, 2008

(30) Foreign Application Priority Data

Feb. 13, 2004    (JP) ............................. 2004-037412

(51) Int. Cl.
*G11B 7/24* (2006.01)
*G11B 7/00* (2006.01)

(52) U.S. Cl. ............................. 369/275.3; 369/124.08

(58) Field of Classification Search ............... 369/275.3
See application file for complete search history.

(56) References Cited

U.S. PATENT DOCUMENTS

| 5,805,537 | A | * | 9/1998 | Yamamoto et al. | ...... 369/124.09 |
| 6,971,024 | B1 | * | 11/2005 | Sako et al. | .................. 713/193 |
| 7,242,767 | B2 | | 7/2007 | Sako et al. | |
| 2002/0159360 | A1 | * | 10/2002 | Tosaki et al. | ............. 369/53.21 |

FOREIGN PATENT DOCUMENTS

JP    H01-042028    2/1989

(Continued)

OTHER PUBLICATIONS

English Translation of Japense Patent Pub. JP,09-139055,A by Matsunaga et al.*

*Primary Examiner*—Joseph H Feild
*Assistant Examiner*—Nicholas Lee
(74) *Attorney, Agent, or Firm*—Drinker Biddle & Reath LLP

(57) ABSTRACT

To provide an information recording apparatus and so on which can improve convenience of handling even if music information is encoded in an LPCM system with a high quality and recorded therein.

Music information M obtained by encoding a musical composition which should be reproduced in an uncompressed state, first control information G1 for controlling the compressed music information PM, compressed music information PM including a content same as at least any one of the music information M, and second control information G2 for controlling the compressed music information PM, the second control information G2 including corresponding information RR representing a corresponding relationship between the music information M and the compressed music information PM.

7 Claims, 6 Drawing Sheets

FOREIGN PATENT DOCUMENTS

| | | |
|---|---|---|
| JP | 09-139055 | 5/1997 |
| JP | 09139055 A * | 5/1997 |
| JP | 2002-117658 | 4/2002 |
| JP | 2002-150675 | 5/2002 |
| JP | 2003-143125 | 5/2003 |
| WO | WO 1/37278 | 5/2001 |

* cited by examiner

INFORMATION RECORDING APPARATUS AND INFORMATION REPRODUCING APPARATUS, INFORMATION RECORDING METHOD AND INFORMATION REPRODUCING METHOD, INFORMATION RECORDING PROGRAM AND INFORMATION REPRODUCING PROGRAM, INFORMATION RECORDING MEDIUM AND RECORDING MEDIUM

TECHNICAL FIELD

The present invention relates to technical fields of information recording apparatus and information reproducing apparatus, information recording method and information reproducing method, information recording program and information reproducing program, and information recording medium and recording medium. In more detail, the present invention relates to technical fields of a recording medium with reproduction information pieces having an identical content and different attributes recorded on to it, information recording apparatus and information recording method for recording the reproduction information pieces into the recording medium, information reproducing apparatus and information reproducing method for reproducing the reproduction information pieces from the recording medium, information recording program and information reproducing program respectively for recording or reproducing the information pieces, and information recording mediums with these programs recorded onto these.

BACKGROUND ART

In recent years, a so-called digital versatile disc (DVD) having a drastically higher recording capacity than that of conventional compact disc (CD) becomes widely generalized. As types of such the DVD, not only a DVD exclusively for reproduction but also a DVD enabling a user to personally record music and images onto it becomes also generalized.

In this, when the above-mentioned conventional DVDs are recorded, a so-called linear pulse code modulation (LPCM) system is used to encode and record music information in order to record the music information while keeping the music information to be recorded in a high sound quality. In this occasion, the music information recorded in this LPCM system can be reproduced only with an information reproducing apparatus having a reproducing (decoding) function corresponding to the LPCM system.

DISCLOSURE OF THE INVENTION

Problems to be Solved by the Invention

However, according to the conventional recording system of music information, a known encoding method of the recorded music information has been only the above-mentioned LPCM system. Therefore, for example, when using a personal computer or the like without a function of reproducing the music information that is encoded using the LPCM system and recorded, there is a problem that a degree of freedom in dealing with music information itself is low such that an easy reproduction process using the personal computer or the like cannot be carried out or the music information, which is encoded using an LPCM system, is prohibited from copying to another recording medium because of its high sound quality.

The present invention is provided in view of the above problems. An example of the problem is to provide an information recording apparatus and an information recording method respectively for improving convenience in handling music information pieces that are encoded using an LPCM system which demonstrates a high sound quality and recorded; an information reproducing apparatus or an information reproducing method respectively for reproducing music information which is recorded with the information recording apparatus or by the information recording method; an information recording program and an information reproducing program respectively for recording the information and reproducing the information; and an information recording medium having these programs recorded onto it.

Means for Solving the Problem

In order to solve the above-mentioned problems, an embodiment of the invention includes an uncompressed information record area where uncompressed information which is obtained by encoding reproduction information to be reproduced in an uncompressed state;

a first control information area where uncompressed information control information for controlling the uncompressed information is recorded;

a compressed information record area where compressed information obtained by encoding another reproduction information including at least a content same as a part of the reproduction information; and a second control information area where compressed information control information for controlling the compressed information is recorded, the compressed information control information including corresponding relationship information for showing a corresponding relationship between the compressed information and the uncompressed information.

In order to solve the above problem, an embodiment of the invention includes a non-compression encode means such as (non-)compression encode unit which generates uncompressed information by encoding reproduction information to be recorded and reproduced in an uncompressed state;

a first control information generation means such as a CPU which generates uncompressed information control information for controlling the uncompressed information thus generated;

a compression encode means such as a compression encode unit which generates compression information by encoding another reproduction information including information having a content same as at least a part of the reproduction information;

a second control information generation means such as a CPU which generates compressed information control information for controlling the compressed information thus generated, the compressed information control information including corresponding relationship information representing corresponding relationship of the uncompressed information and the compressed information; and a record means such as a pickup which records the uncompressed information, the uncompressed information control information control information, the compressed information, and the compressed information control information, respectively thus generated, to a recording medium.

In order to solve the above problem, an embodiment of the invention includes an information reproducing apparatus provided to reproduce at least one of the compressed information and the uncompressed information out of the recording medium described herein, including:

a selection means such as a control unit which is used for selecting any one of a reproduction process of extracting the reproduction information out of the recording medium and reproducing thus extracted and a copy process of detecting the reproduction information out of the recording medium and copying thus detected to another recording medium;

a reproducing means such as a CPU which detects the uncompressed information corresponding to the reproduction information which should be reproduced out of the recording medium and replay thus detected when execution of the copy process is selected by the selection means.

In order to solve the above problem, an embodiment of the invention includes non-compression encode step of generating an uncompressed information by encoding reproduction information which should be recorded and reproduced in an uncompressed state;

a first control information generation step of generating the uncompressed information control information provided to control the uncompressed information thus generated;

a compression and encode step of generating the compressed information by encoding another reproduction information including information having a content same as at least a part of the reproduction information in a compressed state;

a second control information generation step of generating compressed information control information which is provided for controlling the compressed information thus generated and includes a corresponding relationship information representing a corresponding relationship between the uncompressed information and the compressed information; and a record step of recording the uncompressed information, the uncompressed information control information, the compressed information, and the compressed information control information, thus generated to a recording medium.

In order to solve the above problem, an embodiment of the invention includes an information recording method of reproducing at least any one of the compressed information and the uncompressed information from the recording medium described herein, including:

a selection step of selecting any one of a reproduction process of detecting the reproduction information out of the recording medium and reproduce thus detected and a copy process of detecting the reproduction information out of the recording medium and copying thus detected to another recording medium;

a reproduction step of detecting the uncompressed information corresponding to the reproduction information which should be reproduced out of the recording medium and replaying thus detected when execution of the reproduction process is selected in the selection step; and a detection step of detecting the compressed information corresponding to the reproduction information which should be copied and providing thus detected to the copy process when execution of the copy process is selected in the selection step.

In order to solve the above problem, an embodiment of the invention includes to make function a recording computer included in an information recording apparatus for recording reproduction information which should be recorded and reproduced as a non-compression encode means for encoding reproduction information in an uncompressed state and generating the uncompressed information;

a first control information generation means of generating uncompressed information control information provided to control the uncompressed information thus generated;

a compression and encode means for encoding another reproduction information including information having a content same as at least a part of the reproduction information and generating compressed information;

a second control information generation means for generating compressed information control information which is provided for controlling the compressed information thus generated and includes a corresponding relationship information representing a corresponding relationship between the uncompressed information and the compressed information; and a record means for recording the uncompressed information, the uncompressed information control information, the compressed information, and the compressed information control information, respectively thus generated to the recording medium.

In order to solve the above problem, an embodiment of the invention includes to make function a recording computer included in an information recording apparatus for reproducing at least one of the compressed information and the uncompressed information out of the recording medium described herein as a selection means for selecting any one of a reproduction process of detecting the reproduction information out of the recording medium and reproducing thus detected and a copy process of detecting the reproduction information out of the recording medium and copying thus detected to another recording medium;

a reproduction means for detecting the uncompressed information corresponding to the reproduction information which should be reproduced out of the recording medium and replaying thus detected when it is selected to execute the reproduction process by the selection means; and a detection means for detecting the compressed information corresponding to the reproduction information which should be copied and providing thus detected to the copy process when it is selected to execute the copy process by the selection means.

In order to solve the above problem, according to an embodiment of the invention, the information recording program described herein is recorded so as to be readable by the recording computer.

In order to solve the above problem, an embodiment of the invention is recorded so as to be readable by the reproducing computer.

Figure 1:
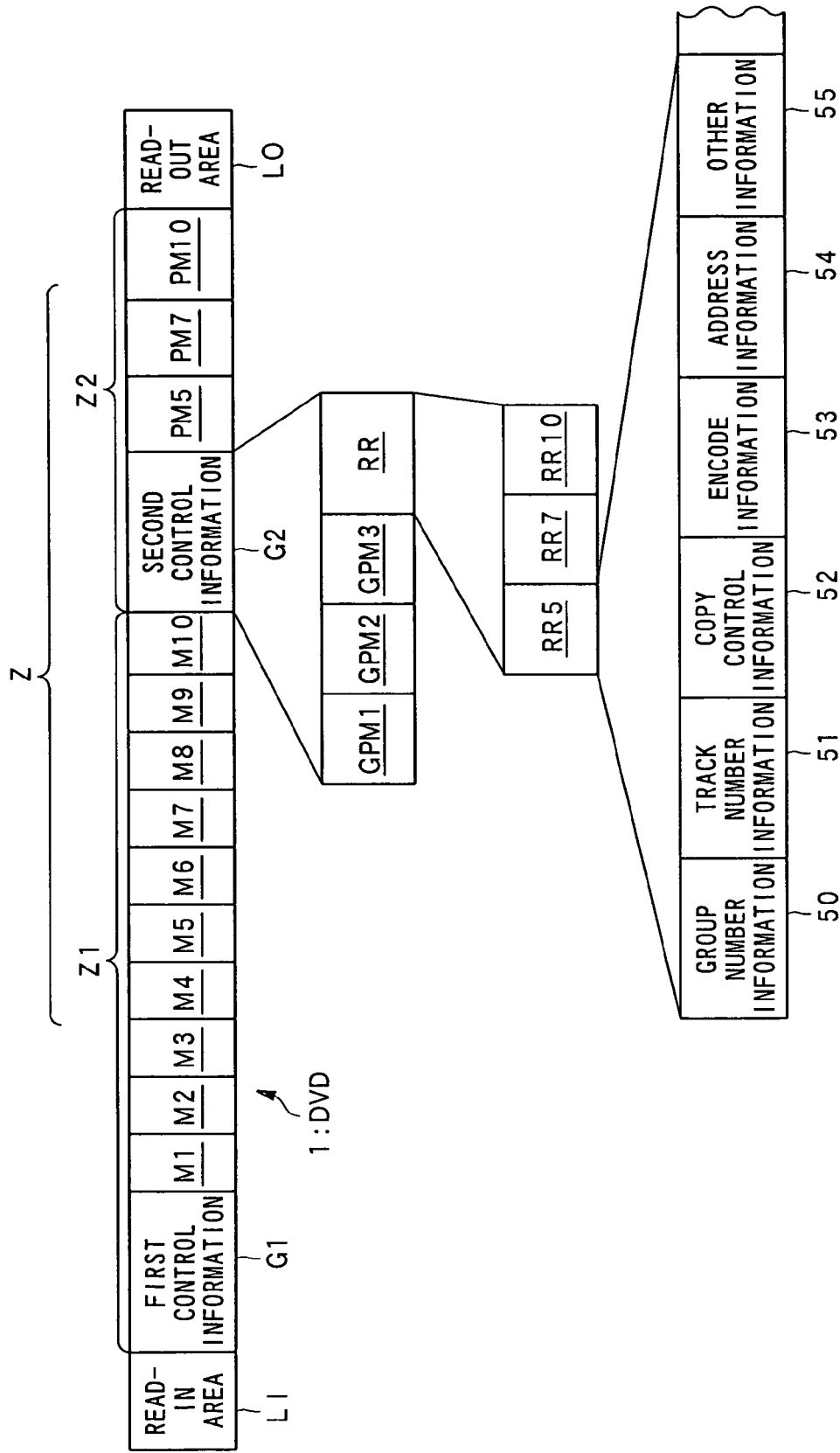
FIG. 1 A view of showing an example of record format related to the embodiment.

1: DVD
3,21: pickup
5: multiplexer
6: first superposition unit

7: second superposition unit
8: compression encode unit
10, 27: CPU
23: decode unit
26: copy control unit
50: group number information
51: track number information
52: copy control information
53: encode information
54: address information
R: recorder
P: player
RR: corresponding information

BEST MODES FOR CARRYING OUT THE INVENTION

Next, a preferable embodiment of the present invention is explained below with reference to the drawings. The embodiment described below is about a case where the present application is applied to a DVD which contains a plurality of music information pieces respectively corresponding to a plurality of musical compositions, which are subjected to restriction of copying to another recording medium, and being encoded in an LPCM system without compression, and also contains any music information piece, which is included in the music information pieces which are recorded without compression and recorded so as to be copied to another recording medium in a state that the music information is compressed.

Figure 2:
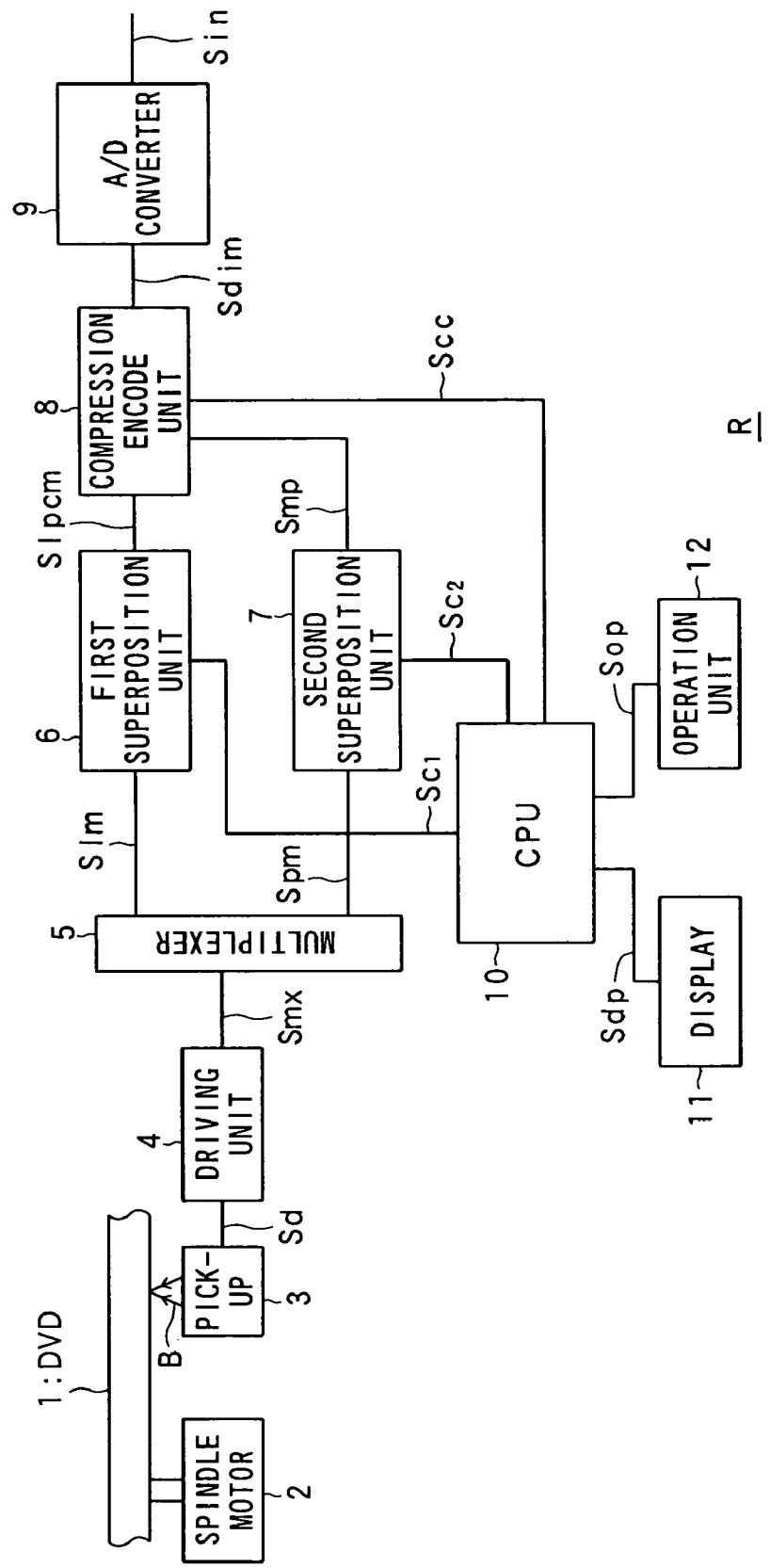
FIG. 2 A block chart for showing a schematic structure of a recorder according to the embodiment.
Figure 3:
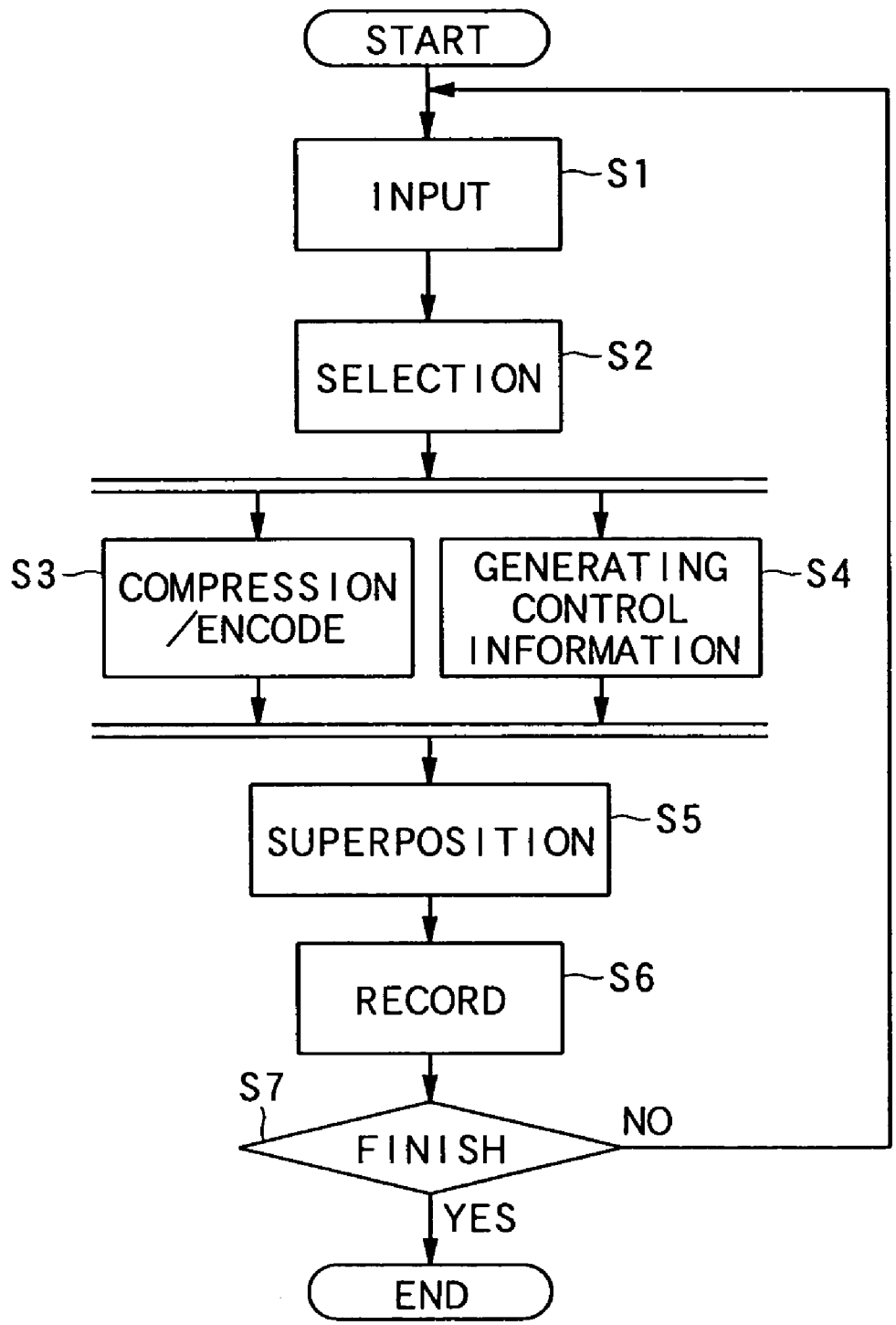
FIG. 3 A flowchart for showing a record process of the recorder according to the embodiment.
Figure 4:
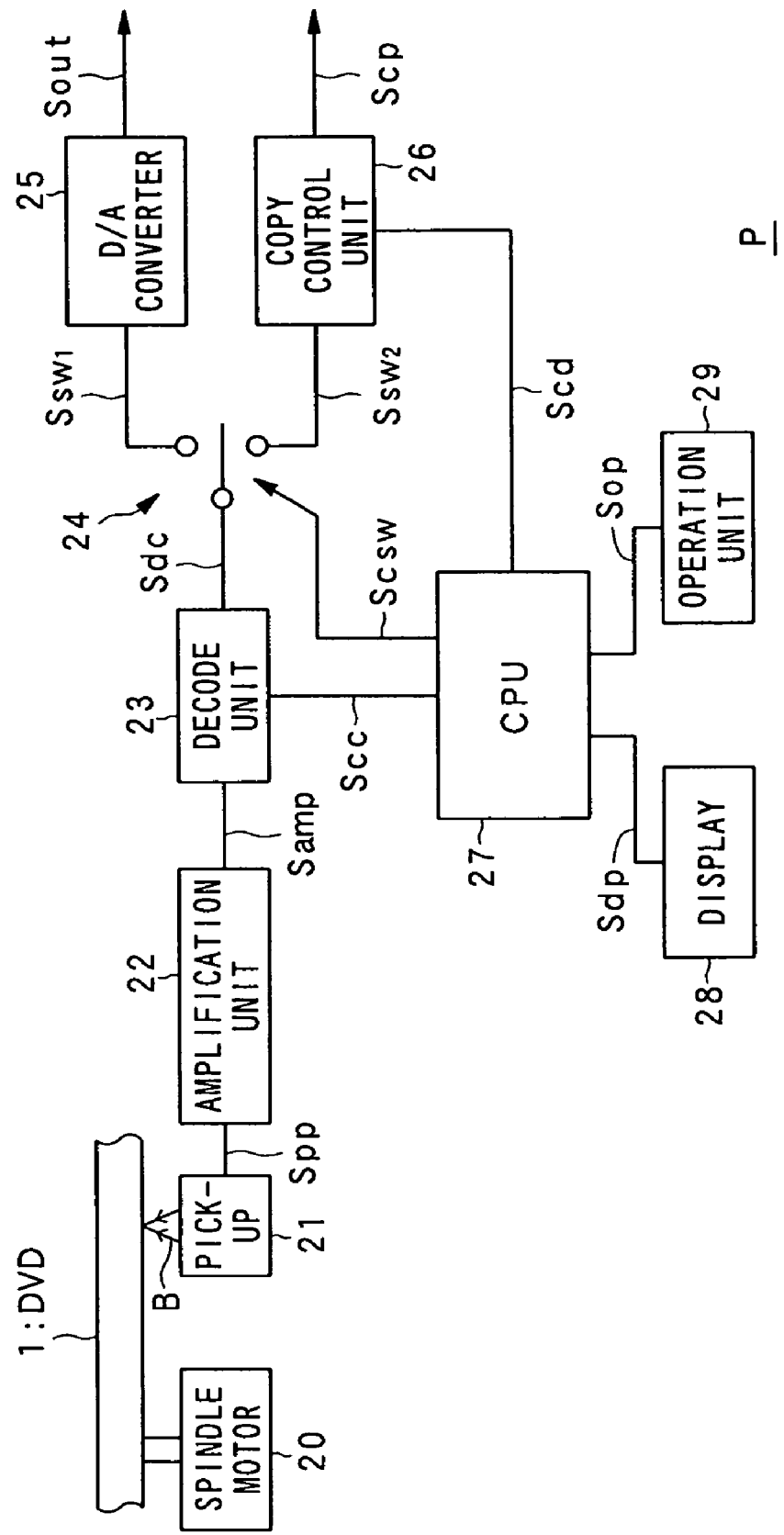
FIG. 4 A block chart for showing a schematic structure of a player according to the embodiment.
Figure 5:
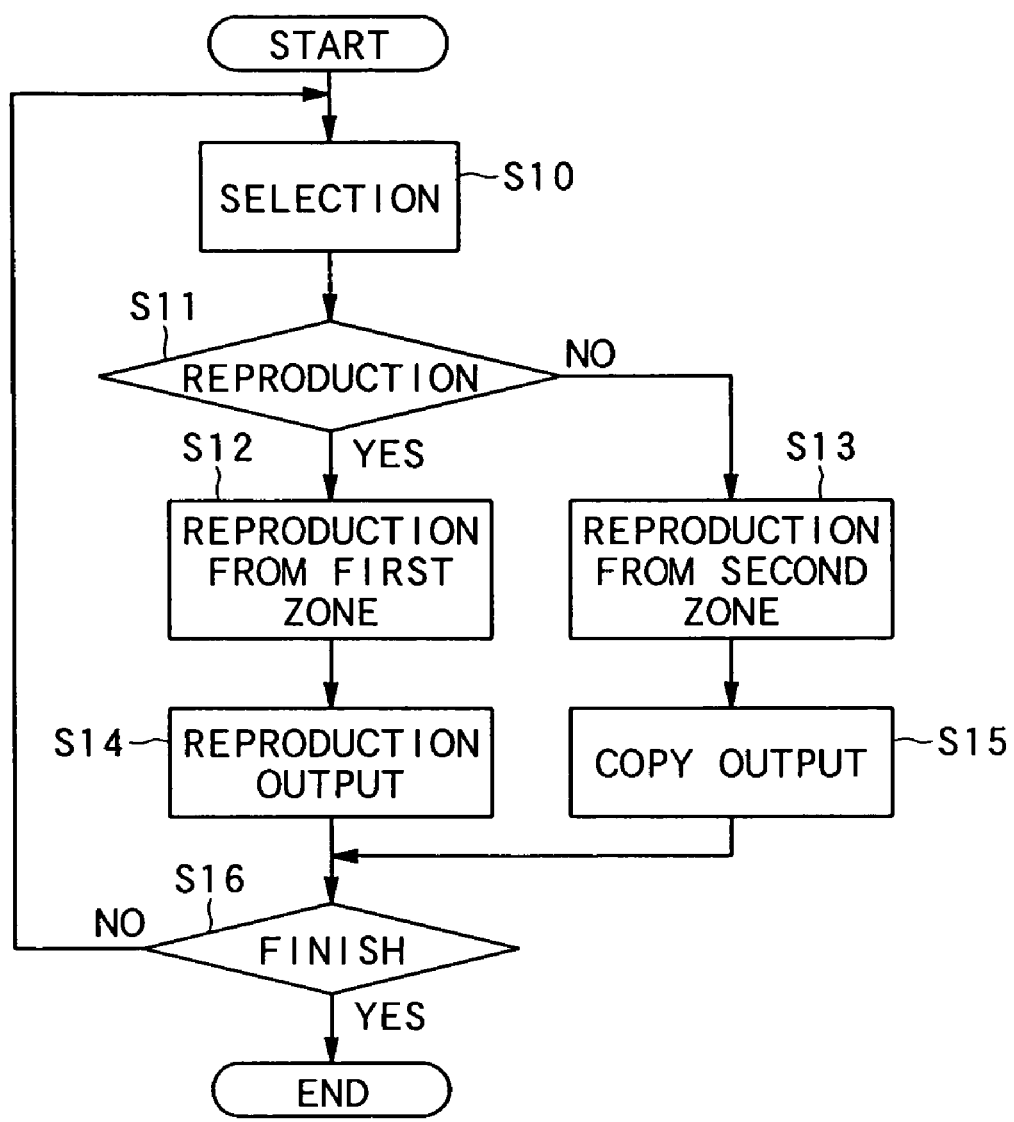
FIG. 5 A flowchart for showing a reproduction process of the player according to the embodiment.

Further, FIG. 1 is to exemplify a physical record format in a DVD according to the embodiment. FIG. 2 is a block-chart showing a schematic structure of a recorder for recording a plurality of music information pieces to the DVD according to the embodiment in a mode described above. FIG. 3 is a flow chart showing a record process concerning the embodiment which is carried out in the recorder. FIG. 4 is a block chart showing a schematic structure of the player for reproducing the music information piece from a DVD having music information of the record format shown in FIG. 1 recorded onto it. FIG. 5 is a flow chart for showing a reproduction process concerning the reproduction process according to the embodiment carried out by the player.

(1) Mode of Carrying Out the Record Format

First, the above record format of DVD according to the present application will be concretely described and exemplified in reference of FIG. 1. FIG. 1 exemplifies a record format of DVD having music information pieces as many as ten which are encoded in an LPCM system to restrict copy thereof and the fifth, seventh and tenth music information pieces, which are compressed by a Moving Picture Expert Group (MPEG) audio layer-3 system (MPEG-3) to enable free copy thereof, among the ten music information pieces which are encoded in the LPCM system.

As shown in FIG. 1, DVD 1 according to the embodiment has a read-in area L1 for recording a start control information and so on that should be first read in reproducing the music information, the data zone Z for recording various music information pieces so that the music information pieces are actually and mutually identified, and a read-out area LO for recording end control information that should be read out when replay of the music information is completed, respectively formed from its inner peripheral side.

The data zone Z is made up of the first zone Z1 for recording music information that is encoded in the above-mentioned LPCM system, and the second zone Z2 for recording music information that is compressed and encoded in the above-mentioned MP-3 system.

At this time, in the first zone Z1, a first music information piece M1 through a tenth music information piece M10 are recorded, which are encoded in an uncompressed state. Further, a control information piece or the like which is used to control a reproducing mode in reproducing the various music information pieces M is recorded as a first control information piece G1 on an inner peripheral side. Here, the content of the first control information piece G1 specifically includes, for example, an address information piece for designating a recording position on the DVD 1 having various music information pieces on the DVD 1, a group identification information piece for designating a group formed by a one music information piece M or a plurality of the music information pieces M, a copy control information piece used when the various music information pieces are copied to another recording medium (more specifically, the copy control information piece showing whether copy of the various music information pieces M are prohibited, a one-time copy is admitted, or the like), or a detailed information piece and the like in encoding the various music information pieces.

On the other hand, inside the second zone Z2, a fifth compressed music information piece PM5, a seventh compressed music information piece PM7, and a tenth compressed music information piece PM10, respectively obtained by compressing and encoding musical compositions corresponding to a fifth music information piece M5, a seventh music information piece M7, and a tenth music information piece M10. Further, a control information piece or the like that is used to control a replay mode in reproducing the compressed music information pieces PM is recorded on a side of inner periphery inside the second zone Z2 with respect to the compressed music information pieces PM as a second control information piece G2.

Next, the second control information piece G2 includes a first compressed control information piece GPM1 corresponding to the fifth compressed music information piece PM5, a second compressed control information piece GPM2 corresponding to the seventh compressed music information piece PM7, a third compressed control information piece GPM3 corresponding to the tenth compressed music information piece PM10, and a corresponding information piece RR being information concerning the fifth music information piece M5, the seventh music information piece M7, and the tenth music information piece M10. Specifically, the contents of the compressed control information GPM includes an address information piece designating a recording position on the DVD 1, for example positions of the compressed music information pieces PM recorded in a manner similar to that of the first control information piece G1, a group identification information piece designating one or a plurality of groups formed in the compressed music information piece PM, a copy control information piece used when the compressed music information pieces PM are copied to another recording medium, more specifically, the copy control information piece representing that it can be freely copied, and a detailed information piece used in encoding the compressed music information pieces PM.

On the other hand, the corresponding information piece RR includes a fifth corresponding information piece RR5 designating the fifth music information M5 corresponding to the fifth compressed music information piece PM5, a seventh corresponding information piece RR7 designating the seventh music information M7 corresponding to the seventh compressed music information piece PM7, and a tenth corresponding information piece RR10 designating the tenth music information M10 corresponding to the tenth compressed music information piece PM10.

The corresponding information pieces RRn are made up of a group number information piece 50 designating the above group where the corresponding music information pieces M respectively belong, a track number information piece 51 designating the number of the corresponding music information piece M itself, a copy control information 52 designating a copy control condition of the corresponding music information M itself, an encode information piece 53 designating details of an encoding system used in the corresponding music information piece M, an address information piece 54 designating a record position on the DVD1 where the corresponding music information M is recorded, and appendix information 55 being other information pieces in the corresponding information pieces RRn. The details of the encoding information piece 53 includes, for example, encoding identification information for identifying an encoding system itself (an LPCM system in the embodiment), information designating frequency band and quantifying bit in the encoding system, information designating a channel number in encoding process, and so on.

As described above, since the above corresponding information pieces RRn are recorded in the second control information pieces G2 for controlling the compressed music information PM so that the corresponding information pieces RRn correspond to the compressed music information pieces PM, a reproduction process described in an embodiment described below becomes possible.

Further, the music information M and the compressed music information PM, having a common content, are recorded as a plurality of information pieces respectively using different encoding systems (specifically an LPCM system for the music information M and an MP-3 method for the compressed music information PM). Therefore, it is possible to expand types of player used for reproducing the contents.

Further, the above structure makes it possible to rapidly reproduce in response to a decoding function of a player. In other words, for example, a reproduction process using an LPCM system having a high sound quality is conducted with a DVD player, which is equipped with a reproducing function in compliance with the LPCM system, and meanwhile a reproduction process using an MP-3 system may be conducted with a personal computer which is not equipped with a reproducing function in compliance with the LPCM system.

(II) Mode of Carrying Out Recorder

Next, a mode of carrying out a recorder for actually recording the music information M or the compressed music information PM into the DVD 1 using the above-described record format of the DVD 1 will be described in reference of FIGS. 2 and 3.

As shown in FIG. 2, the recorder R according to the mode is made up of a spindle motor 2 for rotating the DVD 1 at a predetermined number of revolutions, a pick up 3 as a record means, a drive unit 4, a multiplexer 5, a first superposition unit 6, a second superposition unit 7, a compression encode unit 8 as a compression encoding means and a non-compression encoding means, an A/D (Analogue/Digital) converter 9, a CPU 10 as a first control information generation means and a second control information generation means, a display 11, and an operation unit 12.

Next, the operation is described in its entirety. First, a musical composition to be recorded in the DVD 1 is inputted from an outside as an input information piece Sin as an analogue signal.

The A/D converter 9 digitalizes the input information piece Sin thus inputted and outputs it to the compression encode unit 8 as a digital input information piece Sdin.

Next, the compression encoding unit 8 compresses and simultaneously encodes in the MP-3 system those designated by CPU 10 from among the digital input information pieces Sdin which are inputted by each musical composition. The compressed and encoded information piece Sdin is outputted to the second superposition unit 7 as a compressed music information piece Smp, being the compressed music information piece PM. In parallel thereto, the compression encode unit 8 encodes all digital input information pieces Sdin other than the digital input information Sdin which is designated by the CPU 10 and outputs the encoded digital input information pieces as a music information piece Slpcm of the above music information M to the first superposition unit 6.

Then the first superposition unit 6 superposes a control information piece Sc1 which is to be the first control information piece G1 and outputs it as a superposition information piece Slm to the multiplexer 5.

On the other hand, the second superposition unit 7 superposes the control information piece Sc2 which is to be the second control information piece G2 and outputs it as a superposition information piece Spm to the multiplexer 5.

Accordingly, the multiplexer 5 superposes the above superposition information pieces Slm and Spm in conformity with the record format shown in FIG. 1, and outputs thus superposed to the drive unit 4 as a superposition information Smx.

The drive unit 4 generates a driving signal Sd so as to drive a semiconductor laser device (not shown) equipped in a pick-up 3 by modulating the semiconductor laser device in response to variation of the superposition information piece Smx.

Thereafter, the pick-up 3 drives the semiconductor laser device on the basis of the driving signal Sd to actually form a recording pit by emitting a light beam B as a recording light beam with respect to the DVD 1. Thus the music information piece M, the compressed music information piece PM, and various control information pieces G1 and G2 are recorded onto the DVD 1 in accordance with the record format shown in FIG. 1.

At this time, a control of a focal position of the light beam B, i.e. a tracking servo control and a focus servo control, is conducted by driving of an actuator (not shown) inside the pick-up 3. Further, rotation of the spindle motor 2 is conducted by a spindle servo mechanism (not shown).

In order to realize the above described operation, the CPU 10 outputs a control signal Scc for discriminating a musical composition which should be recorded as the above music information piece M from a musical composition which is recorded as the above compressed music information piece PM (musical compositions respectively corresponding to the fifth music information piece M5, the seventh music information piece M7, and the tenth music information piece M10) to the compression encode unit 8 in response to the operation signal Sop generated base on operation in the operation unit 12 which includes a remote controller and so on. Simultaneously, the CPU 10 generates the above control information pieces Sc1 and Sc2 on the basis of the above operation signal Sop and outputs the signals thus generated respectively to corresponding constitutional parts. In parallel thereto, the CPU 10 generates a display signal Sdp for displaying an operation condition of recorder R and outputs the display signal Sdp to the display 11 such as a liquid crystal display to make the display show the operation condition.

Next, the record process in the recorder R having the above structure according to the embodiment will be specifically described in reference of FIG. 3.

As shown in FIG. 3, in the record process according to the embodiment, an input information piece Sin is first inputted in Step S1. Then a musical composition which should be recorded only as the compressed music information piece M and a musical composition which is recorded also as the above compressed music information piece PM are selected in the operation unit 12 in Step S2.

Then in accordance with thus selected status, the input information piece Sin corresponding to the musical composition which should be recorded only as the music information piece M is encoded in an LCPM system in Step S3. Meanwhile, the input information piece Sin corresponding to the musical composition which is recorded also as the above compressed music information piece PM is encoded (compressed) in both of an LPCM system and an MP-3 system in Step S4. These input information pieces are superposed together with the control information pieces G1 and G2 with the multiplexer 5 or the like. Thus superposed is recorded on the DVD 1 in accordance with the record format shown in FIG. 1 in Step S6.

Then it is confirmed whether or not the sequential record process is completed in reference of display on the display 11 in Step S7. If it is completed along YES in Step S7, the record process according to the embodiment is completed. On the other hand, if it is not completed along NO in Step S7, the process returns to the above Step S1 and the above record process is repeated with respect to the input information piece Sin which should be subjected to the record process.

As the result of the sequential record process, it is possible to record only musical compositions which are desired by a user as the music information piece M and the compressed music information piece PM in the DVD 1, and simultaneously the other musical compositions can be recorded as only the music information piece M in the DVD 1.

(III) Mode of Carrying Out a Player

Next, a mode of carrying out a player for reproducing a musical composition corresponding to any of the music information piece M and the compressed music information piece PM out of the DVD 1 with the music information piece M and the compressed music information piece PM recorded in accordance with the record format shown in FIG. 1 will be described in reference of FIGS. 4 and 5.

As shown in FIG. 4, a player P according to the embodiment is made up of a spindle motor 20 for rotating the DVD 1 at a constant and predetermined rotational speed, a pick-up 21, an amplification unit 22, a decode unit 23, a switch 24, a D/A converter 25, a copy control unit 26, a CPU 27 as a reproducing means and a detection means, a display 28, and an operation unit 29 as a selection means.

Next, an entire operation is described. First, when any of the music information piece M and the compressed music information piece PM is reproduced from the DVD 1, the spindle motor 20 rotates the DVD 1 at the constant and predetermined rotational speed. A certain light beam B being a reproducing light beam having a preset constant intensity is irradiated to the rotating DVD 1. At this time, control of the focal position of the light beam B is conducted by driving the actuator, not shown, in the pickup. Further, the rotation of the spindle motor is conducted with the spindle servo control mechanism (not shown). Further, recording positions of the music information piece M which should be actually reproduced in the DVD 1 are controlled on the basis of information inside the first control information piece G1 or the second control information piece G2.

The pickup 21 receives a reflection light of the light beam B reflected from the DVD 1 with a detector 1 (not shown), generates a light receiving signal Spp corresponding to the light receiving intensity, and outputs thus generated to the amplification unit 22.

Thus the amplification unit 22 amplifies the light receiving signal Spp at a preset amplification degree, generates the amplification signal Samp, and outputs thus generated to the amplification unit 22.

The decode unit 23 decodes in any one of a decoding system corresponding to the above LPCM system and a decoding system corresponding to the above MP-3 system, generates the decoding signal Sdc, and outputs it to the switch 24.

Next, the switch 24 switches over output terminals on the basis of the control signal Scsw from the CPU 27, and outputs the above decode signal Sdc as a reproduction signal Ssw1 or a copy signal Ssw2, respectively to the D/A converter 25 or the copy control unit 26.

Accordingly, the D/A converter 25 converts the outputted reproduction signal Ssw1 into an output signal Sout, being an analogue signal, to thereby output to an externally provided speaker (not shown).

On the other hand, the copy control unit 26 writes over a content such as the above copy control information 52 or the like inside the outputted copy control signal Ssw2 on the basis of the control signal Scd from the CPU 27, and outputs the copy signal Scp to an externally provided copy recorder or the like (not shown).

In order to realize the above operation, the CPU 27 generates the above various control signals Scc, Scsw, and Scd in response to the operation signal Sop on the basis of operation in the operation unit 29 which is made up of a remote controller or the like. In parallel to this, the CPU 27 generates a display signal Sdp for displaying an operation state of the player P, and outputs the display signal to the display 28 including for example a liquid crystal display, to thereby display the above operation state.

Next, a reproduction process according to the embodiment of the player P having the above structure is specifically described in reference of FIG. 5.

As shown in FIG. 5, in the reproduction process according to this embodiment, it is first determined in Step S11 whether a reproduction process is conducted in the player P or the reproduction signal Scp for processing copy is generated, on the basis of the operation signal Sop corresponding to an operation (Step S10) which is conducted in the operation unit 29.

Further, when the reproduction process is selected in the selection process (Step S10) along YES in Step S11, desirable music information M is reproduced from the first zone Z1 and decoded in Step S12 so as to detect and reproduce high sound quality music information M, which is for reproduction but subjected to copy restriction, and outputted to the externally provided speaker or the like (not shown) as the output signal Sout (Step S14).

On the other hand, when the copy process is selected along NO in Step S11, the desirable compression music information PM is reproduced from the second zone Z2 and decoded (Step S13) in use of the above corresponding information RR or the like. Then the decoded signal is outputted as the copy control signal Scp to a copy recorder externally provided (not shown).

At this time, in the processes of the above Steps S12 and S13, the address information such as the above corresponding information RR is referred to in searching and reproducing the desired music information M or the compressed music information PM.

When any one of the output of the output signal Sout and an output of the copy signal Scp ends (Step S14 or S15), it is confirmed whether or not the desired reproduction process is finished in use of a display or the like on the display 11 in Step S16. If it has finished along YES in Step S16, the reproduction process in the mode ends as is. On the other hand, when it has not yet finished along NO in Step S16, the process returns back again to the above Step S10, and repeats the above described reproduction process with respect to the music information M or the compressed music information PM, which should be subjected to reproduction.

According to the above sequential reproduction process, it is possible to quickly search a musical composition desired by a user in use of the above corresponding information RR or the like and copy the musical composition thus searched.

As described, according to the operation of the DVD 1, the recorder R or the player P, the plurality of music information pieces M which are uncompressed, the compressed music information pieces PM which include at least a part of each of the music information pieces M, and the second control information G2 including the corresponding information RR for correlating these are all together recorded in one DVD 1. Therefore, it is possible to reproduce the music information M in an uncompressed state, copy an identical musical composition as the compressed music information PM, or select and reproduce the music information M corresponding to any of the compressed music information pieces PM. Therefore, convenience in handling a musical composition corresponding to the music information piece or the compressed music information PM is extremely improved.

Further, since the corresponding information RR is information provided for searching any of music information pieces M in referring to the second control information G2, it is possible to quickly search the music information M, which should be searched.

Further, since the second control information G2 includes the copy control information 52 representing the content of copy restriction in copying the compressed music information PM to another recording medium, it is possible to appropriately control copy restriction of the music information M corresponding to the compressed music information PM.

Furthermore, the second control information G2 includes the copy control information 52 representing whether or not the music information M is the music information admitted to copy to the another recording medium which corresponds to the compressed music information PM, it is possible to confirm the copy restriction state of the corresponding music information M only in reference of the second control information G2.

Further, since the second control information G2 includes, as the reproduction control information, the group number information 50 or the like which represents the music information M, it is possible to obtain information related to much more music information pieces M in searching the music information M while using the second control information G2.

(IV) Modified Modes

Next, modified modes according to the present application will be described one by one.

Figure 6:
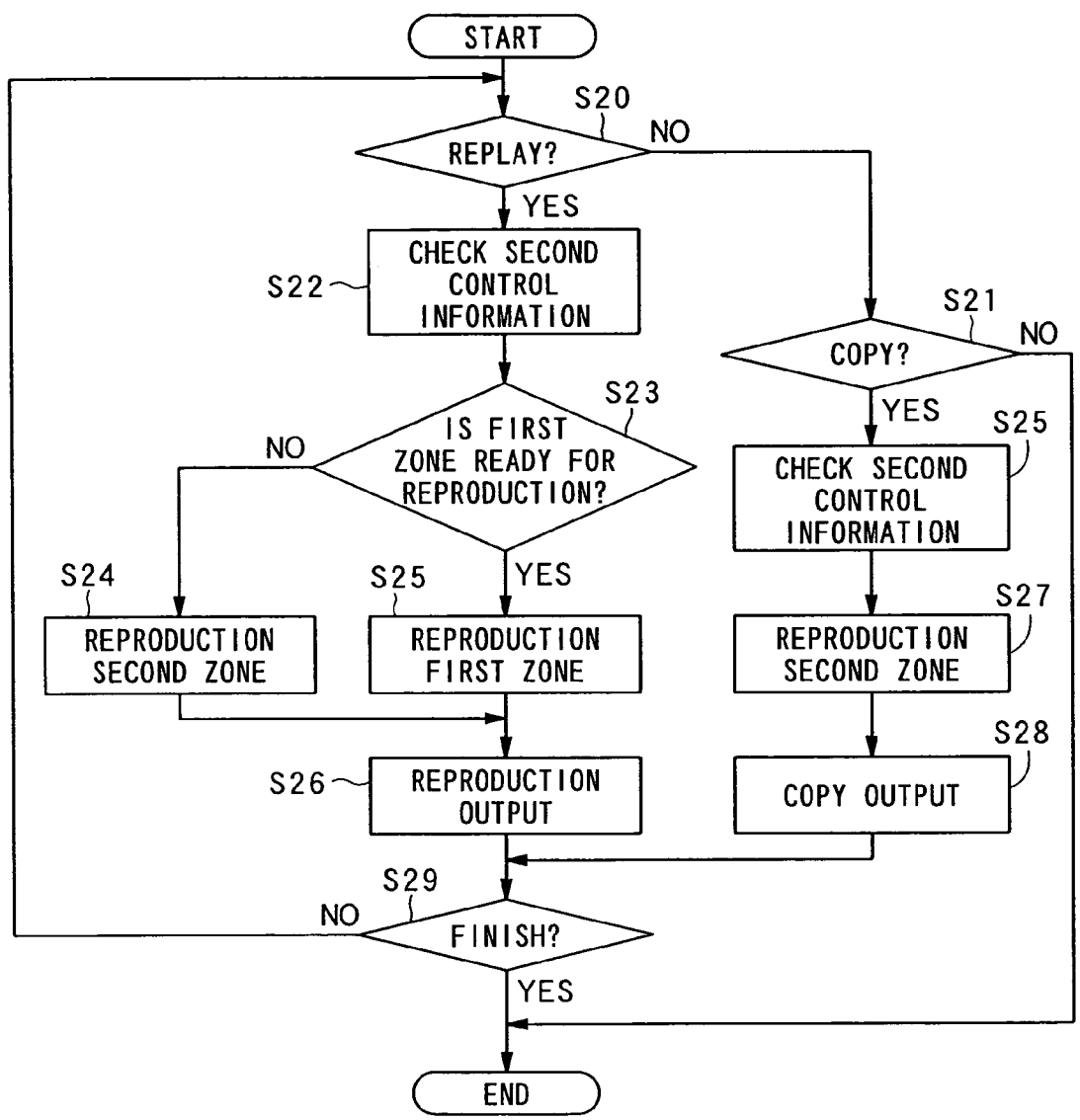
FIG. 6 A flowchart for showing a record process of the player according to the embodiment.

First, as the first modified mode, it is possible to conduct a reproduction process along with the flowchart shown in FIG. 6 in addition to the above described reproduction process with respect to DVD 1.

In other words, according to the reproduction process in the player according to the modified mode, it is judged based on an operation conducted in the operation unit whether the reproduction process is conducted in the player or the copy signal for copy process is generated, as shown in FIG. 6 (Step 20).

Further, when the reproduction process is selected in the selection process (along YES in Step 20), the record position of the music information M in the DVD 1 corresponding to the musical composition, an encoding system thereof, or the like is checked with respect to the musical composition which is to be subjected to the reproduction process thus selected (Step S22). Further, it is checked whether or not the reproduction process can actually be conducted in compliance with an LPCM system (Step S23).

In the judgment of Step S23, when it is possible to conduct the reproduction process in compliance with an LPCM system (along YES in Step S23), the music information piece M corresponding to the selected musical composition is detected from an inside of the first zone Z1 (Step S25), the reproduction output is externally outputted (Step S26), and the process moves to Step S29 described below.

On one hand, in the judgment of Step S22, when it is impossible to conduct the reproduction process in conformity with an LPCM system in the player according to the first modified mode (along NO in Step S23), the compressed music information PM corresponding to the selected music is detected out of the second zone Z2 (Step S24), the reproduction output is outputted to an outside (Step S26), and the process moves to Step S29 described below.

On the other hand, when the reproduction process is not selected in the judgment of Step S20 (along NO in Step 20), it is reconfirmed whether or not a process of copying the music to the other recording medium is selected in the above selection process (Step S21).

When even the copy process is not selected (along NO in Step S21), since there is no process which can be carried out in the player of the first modified mode, the reproduction process according to the first modified mode is completed.

Further, when the copy process is selected in Step S21 (along YES in Step S21), the content of the second control information G2 is confirmed, and the recording position of the compressed music information PM corresponding to the music on the DVD 1, an encode system thereof, and so on are confirmed (Step S25). Further, the compressed music information PM corresponding to the selected music is detected out of the second zone Z2 and reproduced (Step 27). Then the copy output is externally outputted (Step S28).

Then it is confirmed whether or not the operation of completing the process in the player according to the modified example (Step S29). If such the operation is not carried out (along NO in Step S29), the above-described process is repeated after returning to the above Step S20. When the operation of completing the process is carried out (along YES in Step S29), the process in the player according to the first modified example is completed.

According to the player of the first modified mode, described above, the second control information G2 is first confirmed in the reproduction process or the copy process. Then in response to the result, the reproduction process or the copy process is carried out on the basis of a reproduction capability of the player. Therefore, it is possible to quickly select mainly in consideration of sound quality as music.

Further, as the second modified example, although the case where the music information M or the compressed music information PM is recorded and reproduced has been described, in addition to the above case, it is possible to apply the present application to a case where uncompressed image information and compressed image information having a content corresponding to the uncompressed information are recorded into one DVD and reproduce thus recorded DVD.

Further, as a third modified mode, it is possible to constitute so as to make the second control information G2 include only information requisite for the reproduction process (more specifically, only information identical to the first control information G1 and the respective corresponding information pieces RRn) with respect to all of the compressed music information pieces PM into the second control information G2. In this case, by first detecting the second control information G2, it is possible to reproduce both of all the compressed music information pieces PM and the music information pieces M.

Furthermore, although, as the fourth modified mode, the case where the music information M or the compressed music information PM is subjected to the reproduction process or the copy process has been described, it is possible to apply the present application to the reproduction process or the copy process of the image information such as a motion picture, a still picture, and so on besides and in addition to the music information.

Further, according to a fifth modified mode, a program corresponding to the flow chart in FIG. 3 or 5 is previously recorded onto a recording medium such as a flexible disk or a hard disk, or acquired and recorded through an internet or the like. When thus recorded programs are read out with a general-purpose computer and executed, it is possible to use the computer as the CPU 10 or 27 according to the embodiment.

The invention claimed is:

1. A recording medium comprising:
a first area and a second area,
wherein the first area includes:
a first reproduction area storing a plurality of first reproduction information units, which include uncompressed information, to reproduce a plurality of first contents; and
a first control area storing first control information for reproduction controlling the plurality of first reproduction information units; and
wherein the second area includes:
a second reproduction area storing one or more second reproduction information units, which include compressed information, to reproduce one or more second contents; and
a second control area storing second control information for reproduction controlling the one or more second reproduction information units; and
wherein the plurality of first contents in the first reproduction area include contents which are same as all of the second contents in the second reproduction area and other contents which are not same as any of the second contents in the second reproduction area;
the second control area includes corresponding relationship information for indicating a corresponding relationship between the second contents and the first contents, which are same as all of the second contents;
the first area and the second area are formed in one said recording medium.

2. A recording medium according to claim 1, wherein
the first control area includes first track information for indicating track numbers of each of the first reproduction information units;
the corresponding relationship information includes second track information for indicating track numbers of the first reproduction information units to which each of the second reproduction information units corresponds.

3. A recording medium according to claim 1 or 2, wherein
the plurality of first reproduction information units are grouped into a plurality of first groups;
the first control area includes group information for indicating that to which of the first group each of the first reproduction information units belongs;

the plurality of second reproduction information units are grouped into a plurality of second groups;
the second control area includes group information for indicating that to which of the second group each of the second reproduction information units belongs;
the corresponding relationship information further includes second group information for indicating to which of the first reproduction information units belonging to the first group each of the second reproduction information units corresponds.

4. An information recording
apparatus comprising:
a recording device that records a plurality of first reproduction information units to a first reproduction area in a first area of a recording medium, the plurality of first reproduction information units including uncompressed information and being to reproduce a plurality of first contents;
a first control information for reproduction controlling the plurality of first reproduction information units to a first control area in the first area;
one or more second reproduction information units to a second reproduction area in a second area of said recording medium, the one or more second reproduction information units including compressed information, and being to reproduce one or more second contents; and
second control information for reproduction controlling the one or more second reproduction information units to a second control area in the second area;
wherein the plurality of first contents in the first reproduction area include contents which are same as well as all of the second contents in the second reproduction area and other contents which are not same as any of the second contents in the second reproduction area;
the second control area includes corresponding relationship information for indicating a corresponding relationship between the second contents and the first contents, which are same as all of the second contents; and
the first area and the second area are formed in one said recording medium.

5. An information recording method comprising:
a recording process of recording a plurality of first reproduction information units to a first reproduction area in a first area of a recording medium, the plurality of first reproduction information units including uncompressed information and being to reproduce a plurality of first contents:
a first control information for reproduction controlling the plurality of first reproduction information units to a first control area in the first area;
one or more second reproduction information units to a second reproduction area in a second area of said recording medium, the one or more second reproduction information units including compressed information, and being to reproduce one or more second contents; and
second control information for reproduction controlling the one or more second reproduction information units to a second control area in the second area; wherein
the plurality of first contents in the first reproduction area includes contents which are same as all of the second contents in the second reproduction area and other contents which are not same as any of the second contents in the second reproduction area;
the second control area includes corresponding relationship information for indicating a corresponding relationship between the second contents and the first contents, which are same as all of the second contents; and wherein the first area and the second area are formed in one said recording medium.

6. An information reproducing apparatus which reproduces reproduction information units from a recording medium, the recording medium comprising:

a first area and a second area, wherein the first area includes:

a first reproduction area storing a plurality of first reproduction information units, which include uncompressed information, to reproduce a plurality of first contents; and a first control area storing first control information for reproduction controlling the plurality of first reproduction information units; and wherein the second area includes:

a second reproduction area storing one or more second reproduction information units, which include compressed information, to reproduce one or more second contents; and a second control area storing second control information for reproduction controlling the one or more second reproduction information units; and wherein the plurality of first contents in the first reproduction area include contents which are same as all of the second contents in the second reproduction area and other contents which are not same as any of the second contents in the second reproduction area;

the second control area includes corresponding relationship information for indicating a corresponding relationship between the second contents and the first contents, which are same as all of the second contents;

the first area and the second area are formed in one said recording medium, the information reproducing apparatus comprising:

a reading device that reads out the first control information and the second control information; and a reproducing device that reproduces the first reproduction information and the second reproduction information.

7. An information reproducing method which reproduces reproduction information units from a recording medium, the recording medium comprising:

a first area and a second area, wherein the first area includes:

a first reproduction area storing a plurality of first reproduction information units, which include uncompressed information, to reproduce a plurality of first contents; and a first control area storing first control information for reproduction controlling the plurality of first reproduction information units; and wherein the second area includes:

a second reproduction area storing one or more second reproduction information units, which include compressed information, to reproduce one or more second contents; and a second control area storing second control information for reproduction controlling the one or more second reproduction information units; and wherein the plurality of first contents in the first reproduction area include contents which are same as all of the second contents in the second reproduction area and other contents which are not same as any of the second contents in the second reproduction area;

the second control area includes corresponding relationship information for indicating a corresponding relationship between the second contents and the first contents, which are same as all of the second contents:

the first area and the second area are formed in one said recording medium, the information reproducing method comprising:

a reading process of reading out the first control information and the second control information; and a reproducing process of reproducing the first reproduction information and the second reproduction information.

* * * * *